Patented Feb. 17, 1925.

1,527,083

UNITED STATES PATENT OFFICE.

ERWIN SCHMIDT, OF MANNHEIM-WALDHOF, GERMANY, ASSIGNOR TO GESELLSCHAFT FÜR CHEMISCHE PRODUKTION M. B. H., OF MANNHEIM-WALDHOF, GERMANY.

METHOD OF MANUFACTURING A HIGHLY-ACTIVE ADSORPTION CARBON.

No Drawing.  Application filed February 23, 1924.  Serial No. 694,758.

*To all whom it may concern:*

Be it known that I, ERWIN SCHMIDT, a citizen of Germany, and residing at Oppauer-Strasse 136, Mannheim-Waldhof, Germany, have invented a certain new and useful Method of Manufacturing a Highly-Active Adsorption Carbon, of which the following is a specification.

The fact that most active carbons occur in the form of fine powders or at any rate in a form that is not sufficiently resistant to pressure, is attended with many disadvantages, such fine powders only being capable of being filtered with great difficulty or, when used for gas absorption, offering too high a resistance, while they break up easily and large quantities may be carried along by a stream of gas.

In order to overcome these drawbacks it has already been proposed to produce the activated carbon on passive porous and refractory supports, such as silicic acid, diatomite, pumice-stone and the like. It was found, however, that, when treated in this manner, the absorption value is more or less reduced by the mass of the support, so that a low limit of activity cannot be passed.

It has been found that an extremely highly activated carbon, which is also very suitable for gas absorption is obtained, if in place of passive refractory supports absorbent, combustible cellulose-containing supports are used, such as wood, cork waste, straw or some other cellulose-containing substance and by using sulphite cellulose waste liquor as the primary material for producing the highly active carbon.

The method may for instance be carried out by soaking wood, say in the form of small shavings, with sulphite waste liquor, and carbonizing it by heating to a carbonizing temperature. Suitable additions of salts and the like may be used in a known manner. In this way a granular carbon having an extremely high power of adsorption is obtained, which is also suitable for the absorption of gas. Experiments have shown, that the activity of such carbons is as a rule even higher than that of carbons obtained from untreated or preliminarily treated sulphite waste liquor alone (without support) by carbonization. By carbonizing the support as well, the activity of the product is not reduced (as might be expected), but is considerably increased.

What I claim is:—

A method of manufacturing a highly active adsorption carbon, which comprises impregnating an absorbent, combustible unrotted cellulose-containing substance, with sulphite waste liquor and thereafter carbonizing such impregnated material, under temperature conditions such as to form highly active adsorption carbon.

In testimony whereof I have signed my name to this specification.

DR. ING. ERWIN SCHMIDT.